US007398401B2

(12) United States Patent
Goud et al.

(10) Patent No.: US 7,398,401 B2
(45) Date of Patent: Jul. 8, 2008

(54) METHOD AND APPARATUS FOR COMMUNICATING INFORMATION FROM AN OPERATING SYSTEM BASED ENVIRONMENT OF A SERVER BLADE TO THE CHASSIS MANAGEMENT MODULE

(75) Inventors: Gundrala D. Goud, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 10/809,114

(22) Filed: Mar. 25, 2004

(65) Prior Publication Data

US 2005/0216627 A1    Sep. 29, 2005

(51) Int. Cl.
*G06F 1/00* (2006.01)
*G06F 15/173* (2006.01)

(52) U.S. Cl. .................. 713/300; 713/310; 709/226

(58) Field of Classification Search ................. 713/300, 713/310; 710/301, 302; 709/224, 226
See application file for complete search history.

(56) References Cited

U.S. PATENT DOCUMENTS

| 6,771,499 B2 * | 8/2004 | Crippen et al. ............... 361/687 |
| 6,950,952 B2 * | 9/2005 | Felsman ...................... 713/310 |
| 6,968,466 B2 * | 11/2005 | Bolian et al. ................. 713/300 |
| 6,976,112 B2 * | 12/2005 | Franke et al. .................. 710/32 |
| 7,082,488 B2 * | 7/2006 | Larson et al. ................ 710/301 |
| 2002/0002589 A1 * | 1/2002 | Yonenaga et al. ........... 709/206 |
| 2002/0188718 A1 * | 12/2002 | McGraw et al. ............. 709/224 |

* cited by examiner

*Primary Examiner*—Suresh K Suryawanshi
(74) *Attorney, Agent, or Firm*—L. Cho (57) ABSTRACT

A method for managing information from an operating system based environment includes determining whether the information is to be communicated to a chassis management module. The information is transmitted to a service processor upon determining that the information is to be communicated with the chassis management module.

22 Claims, 6 Drawing Sheets

FIG. 6

METHOD AND APPARATUS FOR COMMUNICATING INFORMATION FROM AN OPERATING SYSTEM BASED ENVIRONMENT OF A SERVER BLADE TO THE CHASSIS MANAGEMENT MODULE

TECHNICAL FIELD

An embodiment of the present invention relates to power management in a blade server system. More specifically, an embodiment of the present invention relates to a method and apparatus for communicating information from an operating system based environment of a server blade to a chassis management module in a blade server system.

BACKGROUND

A blade server system packages servers onto single boards (server blades) that are housed in a chassis that provides access to shared resources such as power. A chassis management module operates to manage the shared resources among the server blades. Currently, when the server blade is booted to an operating system, it is unable to communicate with the chassis management module to exchange information about power events such as Advanced Configuration and Power Interface (ACPI) (published 1996) power states.

ACPI is an open industry specification that establishes industry-standard interfaces for operating system directed power management on laptops, desktops, and servers. ACPI enables an operating system to control an amount of power given to an entire computer system or specific devices attached to the computer system. To conserve energy while remaining quickly available, ACPI defines a number of sleep states known as S-states. An ACPI-compliant computer system may implement some or all of the defined S-states.

Commonly supported S-states include the S0, S1, S4, and S5 sleep states. The S0 sleep state is a state where all the devices on the computer system are on and no sleep is enabled. The S1 sleep state is a low wake-up latency sleep state. In the S1 sleep state, the computer system context in the processor and/or chip set is maintained. The S4 sleep state (non-volatile sleep state) is a special global system state that allows system context to be saved and restored relatively slowly when power is lost to the baseboard. The operating system writes system context to a non-volatile storage file and leaves appropriate context markers. The S5 sleep state is similar to the S4 sleep state except the operating system does not save any context nor enable any devices to wake up the system. The system is in the "soft" off state and requires a complete boot when awakened.

Currently, a server blade's operating system is unable to communicate ACPI sleep states to an off-board chassis management module responsible for power management. Thus, what is needed is a method and apparatus for communicating information from an operating system based environment of a server blade to the chassis management module.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. However, it will be apparent to one skilled in the art that these specific details may not be required to practice the embodiments of the present invention. In other instances, well-known circuits, devices, and programs are shown in block diagram form to avoid obscuring embodiments of the present invention unnecessarily.

Figure 1:
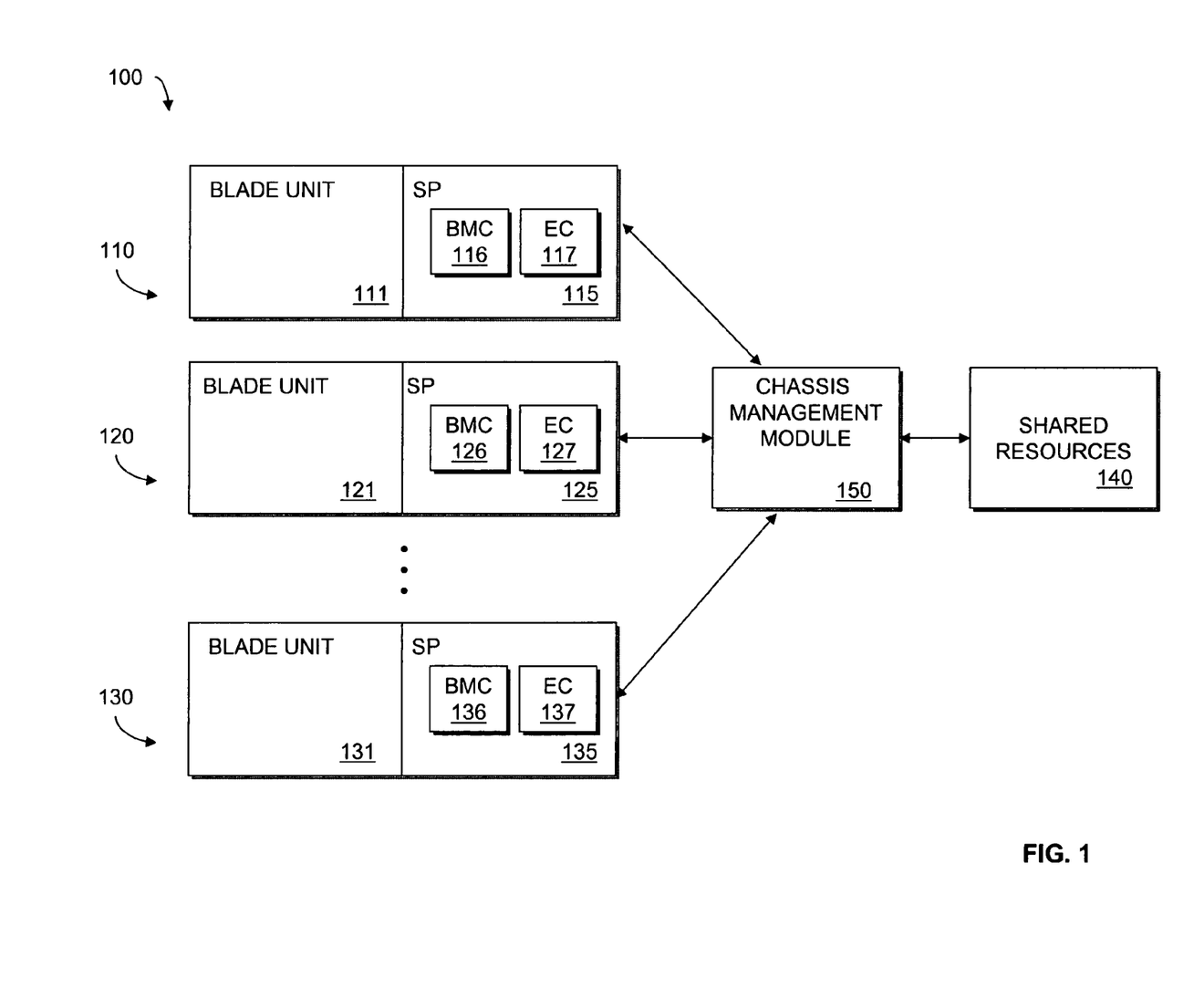
FIG. 1 is a block diagram of a blade server system in which an embodiment of the present invention resides.

FIG. 1 is a block diagram of a blade server system 100 in which an embodiment of the present invention resides. The blade server system 100 includes a plurality of server blades. Block 110 represents a first server blade, block 120 represents a second server blade, and block 130 represents an nth server blade, where n may be any number. Each of the server blades 110, 120, and 130 may be implemented on a single circuit board. Server blades 110, 120, and 130 include blade units 111, 121, and 131 respectively. Each of the blade units 111, 121, and 131 is an inclusive computing system that may include one or more processors, memory, communication paths, and other resources.

Server blades 110, 120, and 130 include service processors (SP) 115, 125, and 135 respectively. The service processors 115, 125, and 135 provide monitoring and control functionality to its corresponding server blade. Each of the service processors 115, 125, and 135 includes a baseboard management controller (BMC) 116, 126, and 136 respectively. The baseboard management controller 116, 126, and 136 may maintain event logs, manage sensor data, and support other functions for its corresponding server blade. According to an embodiment of the blade server system 100, the service processors 115, 125, and 135 may be Intelligent Platform Management Interface (IPMI) (published 2002) based service processors.

Each of the service processors 115, 125, and 135 also includes an embedded controller (EC) 117, 127, and 137. The embedded controllers 117, 127, and 137 may operate to generate information including information to indicate the occurrence of power management events. The embedded controllers 117, 127, and 137 may generate the information in response to data received from its corresponding service processor 115, 125, and 135. Alternatively, the embedded controllers 117, 127, and 137 may forward information received from an operating system running on its corresponding blade unit 111, 121, and 131. According to an embodiment of the blade server system 100, the embedded controllers 117, 127, and 137 are Advance Configuration Power Interface (ACPI) (published 1996) based embedded controllers. In this embodiment, each of the service processors 115, 125, and 135 has an ACPI based embedded controller interface.

The blade server system 100 includes shared resources 140. The shared resources 150 may include a network interface, storage device, power supply, cooling/ventilation system, and/or other resources that may not be available on the server blades 110, 120, and 130 and must be shared among the server blades 110, 120, and 130.

The blade server system 100 includes a chassis management module (CMM) 150. The chassis management module 150 manages access to the shared resources 140 between the server blades 110, 120, and 130. The chassis management module 150 has a dedicated channel to each of the server blades 110, 120, and 130 where information, request/grants to access shared resources, and other data may be transmitted. The dedicated channel may be, for example, a RS485 or other bus. The chassis management module 150 resides on a separate board from server blades 110, 120, and 130. The chassis management module 150 may be housed in a same chassis as the server blades 110, 120, and 130. According to an embodiment of the blade server system 100, communication between the chassis management module 150 and the server blades 110, 120, and 130 is conducted using the IPMI protocol. It should be appreciated that the chassis management module 150 may be implemented by a management agent that may or may not necessarily reside on a separate module.

Figure 2:
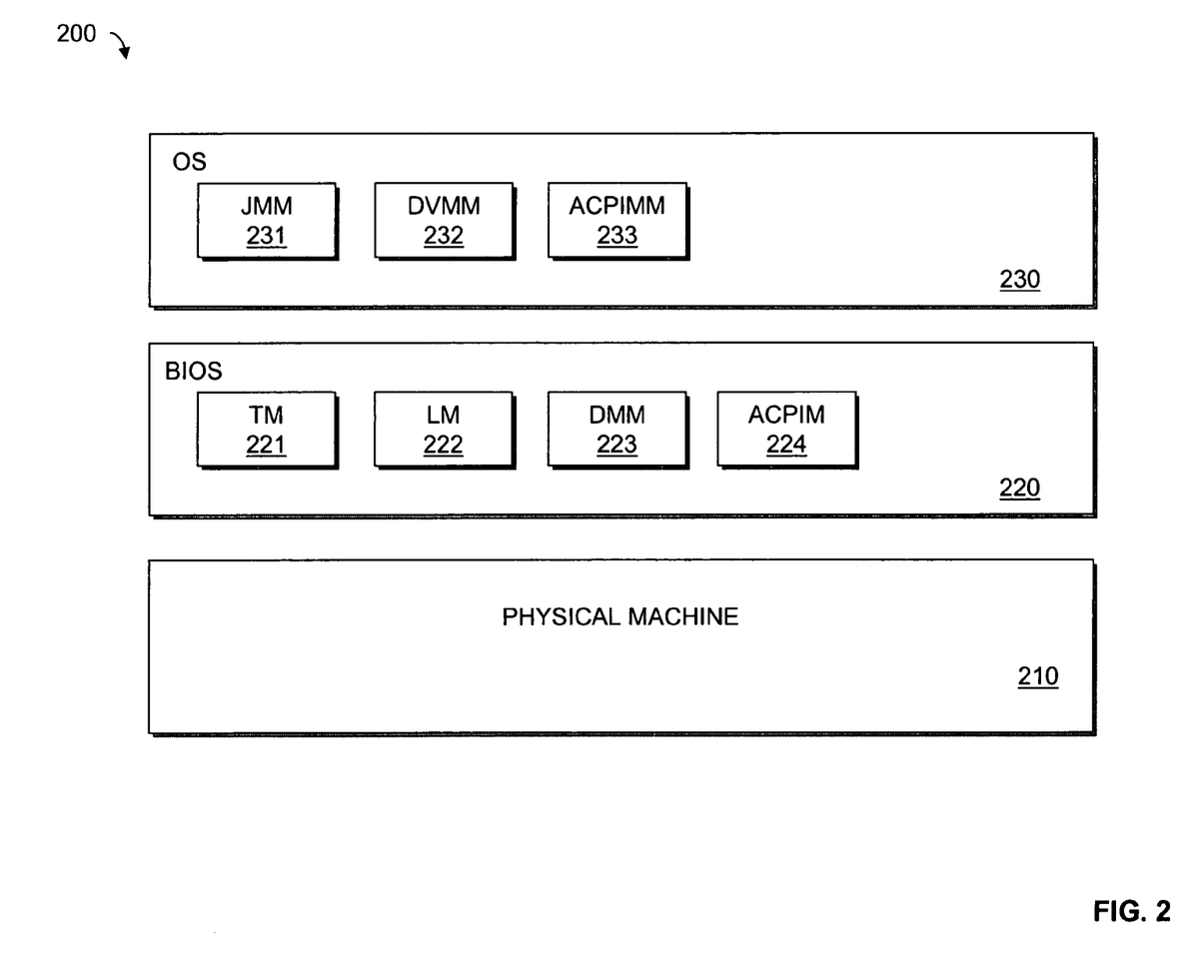
FIG. 2 is a block diagram that illustrates conceptual components of a blade unit according to an embodiment of the present invention.

FIG. 2 is a block diagram that illustrates conceptual components of a blade unit 200 according to an embodiment of the present invention. The blade unit 200 may be implemented as one of the blade units 111, 121, and 131 shown in FIG. 1. The blade unit 200 includes a physical machine 210. According to one embodiment, the physical machine 110 may be components of a computer system such as, for example, one or more processors, main memory, buses, input output (10) devices, and other components.

The blade unit 200 includes a basic input/output system (BIOS) 220. The BIOS 220 is a program that may be stored in read only memory (ROM) that is run when the server unit 200 is booted up. The BIOS 220 includes a tester module (TM) 221. The tester module 221 performs a power-on self test (POST) to determine whether the components on the blade unit 200 are operational. The BIOS 220 includes a loader module (LM) 222. The loader module 222 locates and loads programs and files such as boot programs, system files, and the operating system. The BIOS 220 includes a data manager module (DMM) 223. The data manager module 223 manages data flow between the operating system of the blade unit 200 and other components coupled to the blade unit 200.

The BIOS 220 includes an ACPI module (ACPIM) 224. The ACPI module 224 operates to enable operating system-directed configuration and power management (OSPM). The ACPI module 224 describes the characteristic of the blade unit 200 by placing data, organized into tables, such as Root System Description Table (RSDT) and Differentiated System Description Table (DSDT) into a main memory of the blade unit 200. According to an embodiment of the present invention, the ACPI module 224 also includes ACPI methods that direct information from an operating system environment of blade unit 200 to be transmitted to a service processor corresponding to the blade unit 200. The ACPI methods may direct the information to be transmitted to the service processor via its embedded controller. The ACPI methods may be implemented using, for example, ACPI source language (ASL) that is compiled into ACPI machine language (AML).

The blade unit 200 includes an operating system (OS) 230. The operating system 230 runs above the BIOS 220 and manages programs run on the blade unit 200. The operating system 230 includes a job management module (JMM) 231. The job management module 231 controls the order and time in which applications and tasks are run. The operating system 230 includes a device management module (DVMM) 232. The device management module 232 controls devices coupled to the blade unit 200 by sending commands in the proprietary languages of the devices. The device management module 232 may include device drivers for peripheral devices. The operating system 230 includes an ACPI management module (ACPIMM) 233 that supports functionalities required by ACPI. The ACPI management module 233 includes an AML interpreter that interprets AML in the ACPI module 224. It should be appreciated that the BIOS 220 and the operating system 230 may include other modules to support other functionalities.

Figure 3:
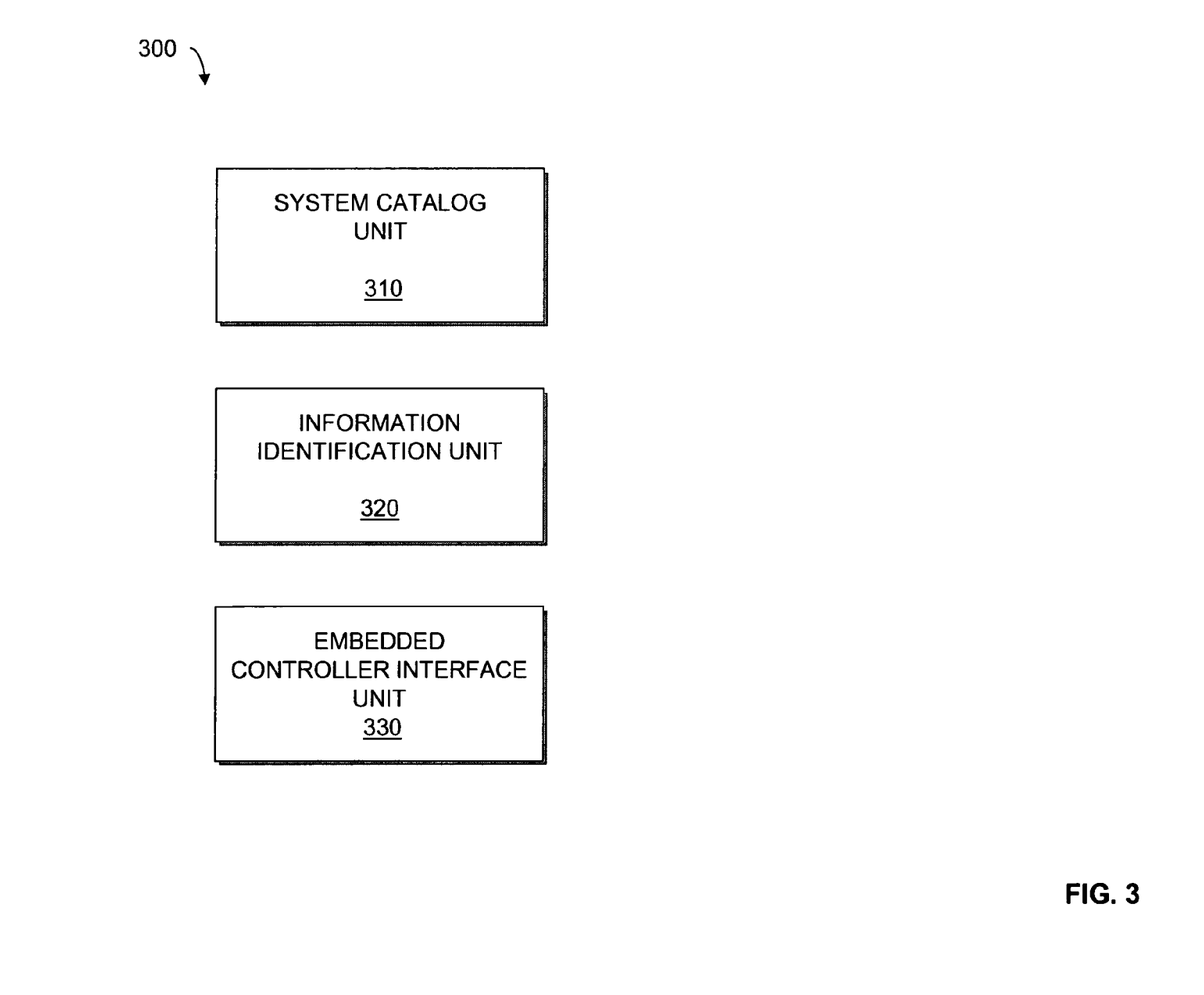
FIG. 3 is a block diagram of an Advance Configuration Power Interface (ACPI) module according to an embodiment of the present invention.

FIG. 3 is a block diagram of an ACPI module 300 according to an embodiment of the present invention. The ACPI module 300 may be implemented as the ACPI module 224 shown in FIG. 2. The ACPI module 300 operates to enable a computer system to support OSPM. The ACPI module 300 includes a system catalog unit 310 that describes the characteristic of a computer system to its operating system. According to an embodiment of the ACPI module 300, the system catalog unit 310 places data describing characteristics of the computer system into tables stored in the main memory of the computer system. The tables may include a RSDT and a DSDT.

The ACPI module 300 includes an information identification unit 320. The information identification unit 320 identifies information originating from an operating system environment that is directed to a chassis management module. The information identification unit 320 may identify information such as events or states detected by the operating system. According to an embodiment of the ACPI module 300, the information identification unit 320 identifies ACPI sleep states directed to the chassis management module.

The ACPI module 300 includes an embedded controller interface unit 330. The embedded controller interface unit 330 transmits the information identified by the information identification unit 320 that is to be directed to the chassis management module to a service processor on the same circuit board as the computer system. The embedded controller interface unit 330 may direct the information to be transmitted to the service processor via its embedded controller using the Smart Management Bus (SMBus) protocol (published 1995).

It should be appreciated that the system catalog unit 310, information identification unit 320, and embedded controller interface unit 330 may be implemented as ASL methods in a BIOS using ASL that is compiled into AML. An ASL method may be a program in the ACPI source language. It should further be appreciated that the ACPI module 300 may utilize additional ASL methods to implement other functionalities.

Figure 4:
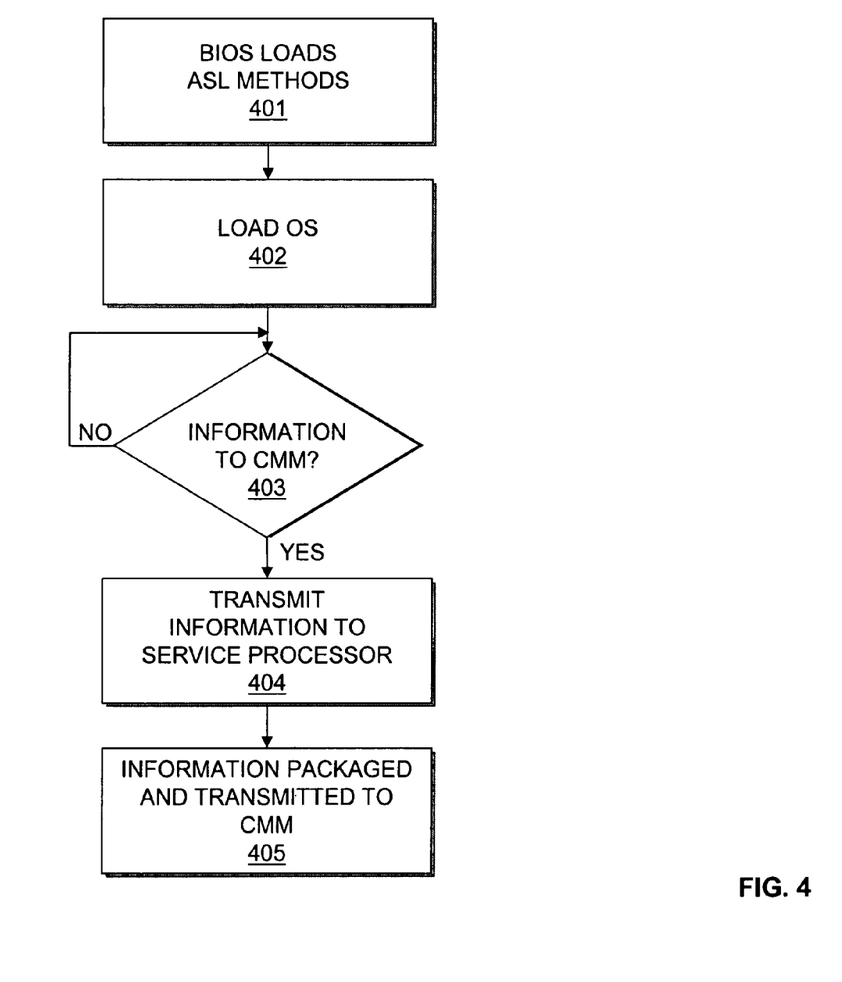
FIG. 4 is a flow chart illustrating a method for communicating information from an operating system based environment according to an embodiment of the present invention.

FIG. 4 is a flow chart illustrating a method for communicating information from an operating system based environment according to an embodiment of the present invention. The operating system based environment may be, for example, in a blade server system. At 401, the BIOS loads the ASL methods. According to an embodiment of the present invention, the BIOS loads the ASL methods when a computer system is booted.

At 402, the operating system for the computer system is loaded. According to an embodiment of the present invention, the BIOS gives control of the computer system to the operating system.

At 403, it is determined whether information originating from the operating system environment is to be transmitted to a chassis management module. The information may include a power event such as an ACPI sleep state. It should be appreciated that the information may be any predefined information specified by the ASL method. If it is determined that the information originating from the operating system environment is not to be transmitted to the chassis management module, control returns to 403. If it is determined that the information originating from the operating system environment is to be transmitted to the chassis management module, control proceeds to 404.

At 404, the information is transmitted to the service processor. According to an embodiment of the present invention, the information is transmitted to the service processor via the embedded controller.

At 405, the information is packaged and transmitted to the chassis management module. According to an embodiment of the present invention, the information is packaged in a format recognizable to the management agent. The format may be, for example, a packet compliant with the IPMI protocol.

FIGS. 4 is a flow chart illustrating embodiments of the present invention. Some of the procedures illustrated in the figures may be performed sequentially, in parallel or in an order other than that which is described. It should be appreciated that not all of the procedures described are required, that additional procedures may be added, and that some of the illustrated procedures may be substituted with other procedures.

Figure 5:
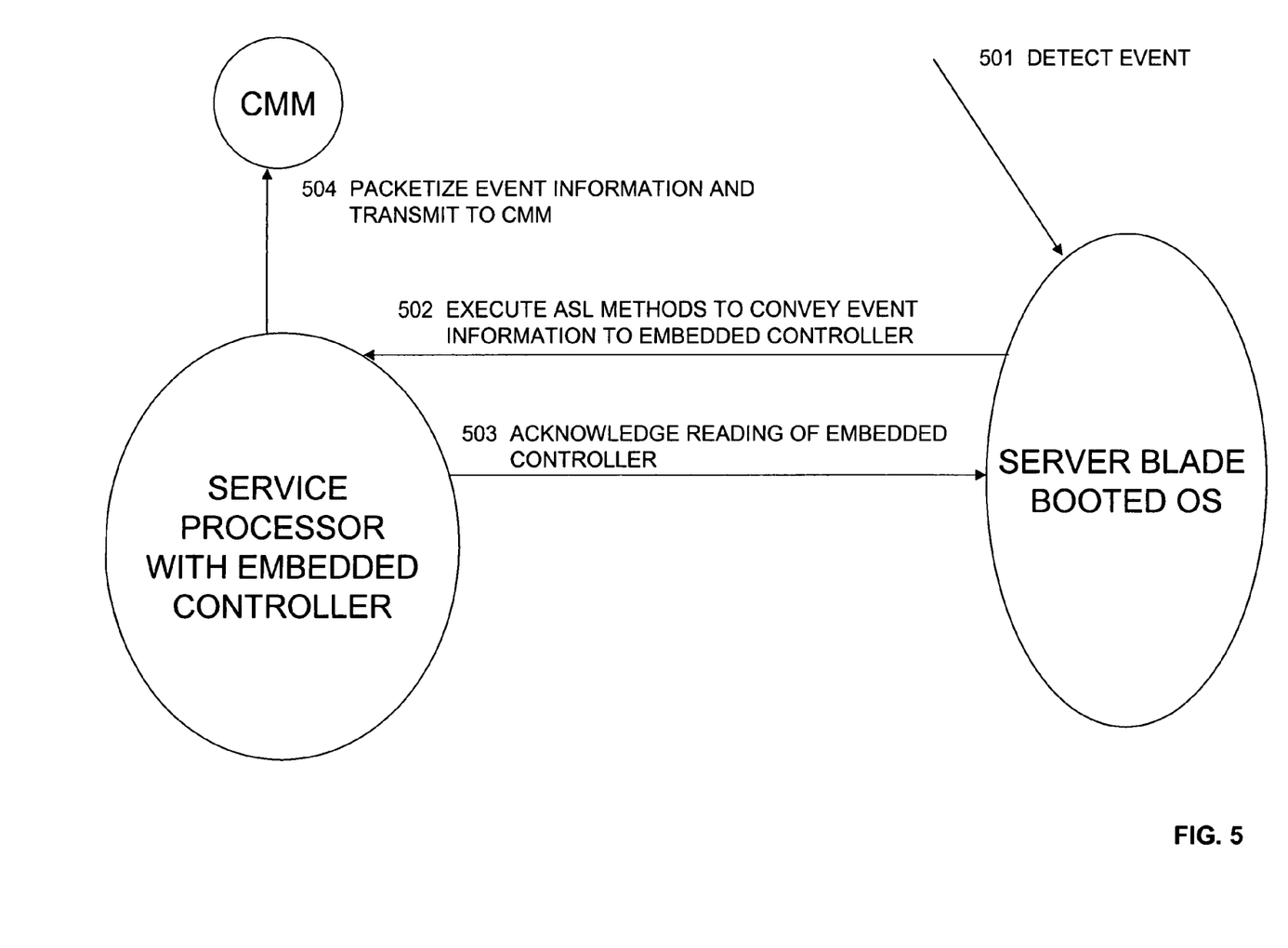
FIG. 5 illustrates an example of how an ASL method may be used according to an embodiment of the present invention.

FIG. 5 illustrates an example of how an ASL method may be used according to an embodiment of the present invention. At 501, a blade unit booted to an operating system detects an event.

At 502, the operating system on the blade unit executes an ASL method to convey information about the detected event to an embedded controller on a service processor.

At 503, the service processor may acknowledge a reading of the embedded controller to the operating system.

At 504, the information about the detected event is packetized and sent to a chassis management module.

Figure 6:
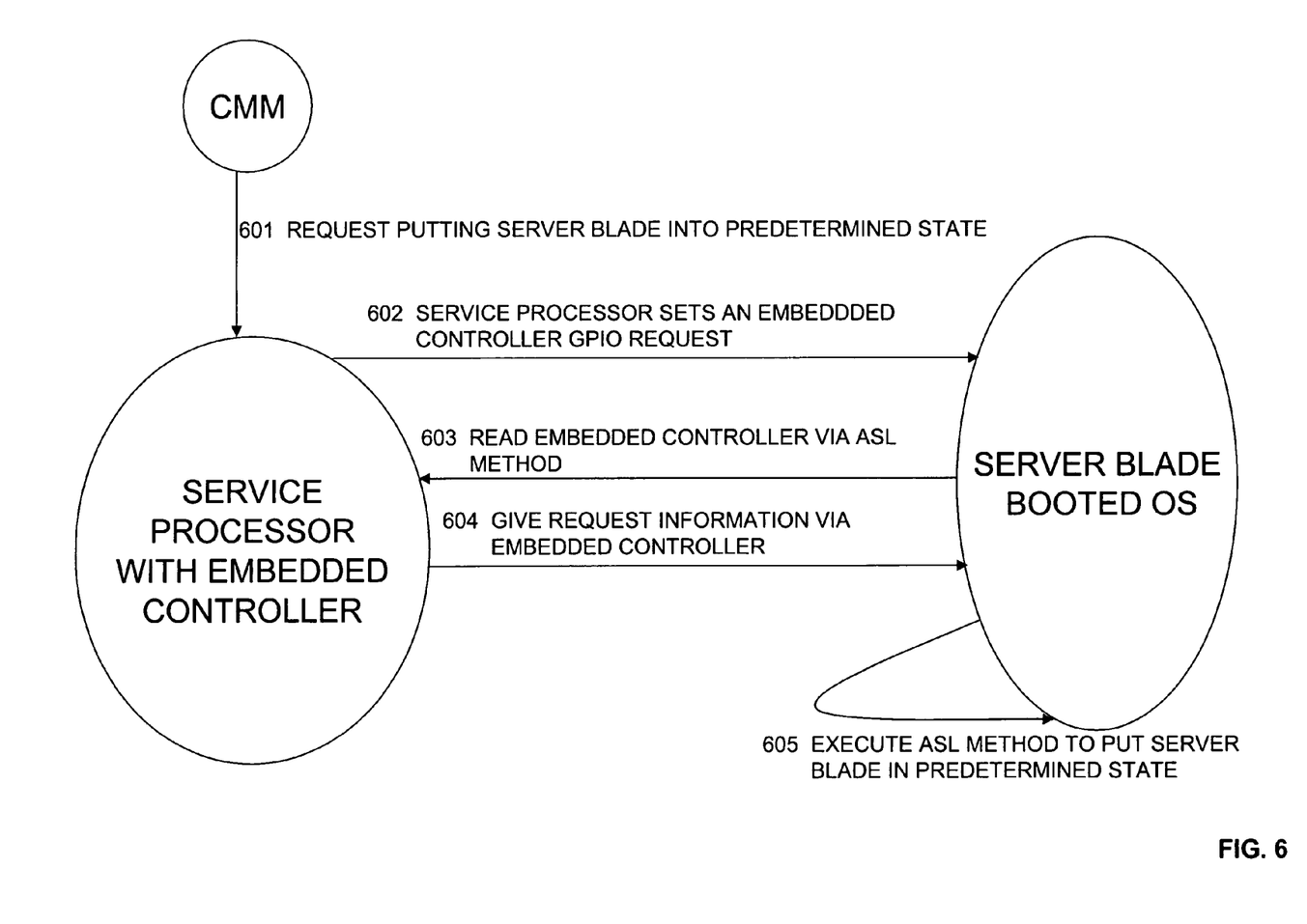
FIG. 6 illustrates an example of how an ASL method may be used according to a second embodiment of the present invention.

FIG. 6 illustrates an example of how an ASL method may be used according to a second embodiment of the present invention. At 601, a chassis management module requests putting a blade unit into a predetermined state.

At 602, a service processor sets an embedded controller general purpose input output (GPIO) request.

At 603, the embedded controller is read by a blade booted to an operating system via an ASL method.

At 604, information about the request for putting the blade unit into the predetermined state is given to the blade booted operating system via the embedded controller.

At 605, the blade unit is put into the predetermined state via an ASL method.

According to an embodiment of the present invention, a communication path is established between a runtime operating system of a blade unit and a chassis management module. The communication path originates from the operating system environment and runs through the service processor via an embedded controller before ending at the chassis management module. By providing this communication path the operating system is allowed to communicate information to the chassis management module such as power events like ACPI sleep states. The chassis management module may operate to monitor and administer power consumption requirement and improve power efficiency to the computer system and the server system in response to the received information.

In the foregoing specification, the embodiments of the present invention have been described with reference to specific exemplary embodiments thereof. It will, however, be evident that various modifications and changes may be made thereto without departing from the broader spirit and scope of the embodiments of the present invention. The specification and drawings are, accordingly, to be regarded in an illustrative rather than restrictive sense.

What is claimed is:

1. A method for communicating information from an operating system based blade server system environment, comprising:
   transmitting the information to an Advance Configuration Power Interface (ACPI) based embedded controller on the service processor; and
   transmitting the information from the service processor to a chassis management module via a dedicated channel.

2. The method of claim 1, wherein transmitting the information to the service processor comprises transmitting the information using a System Management Bus (SMBus) protocol.

3. The method of claim 1, wherein the service processor is Intelligent Platform Management Interface (IPMI) based.

4. The method of claim 1, further comprising packaging the information in a format recognizable to a management agent.

5. The method of claim 1, further comprising packaging the information using an Intelligent Platform Management Interface (IPMI) protocol.

6. The method of claim 1, wherein the information is transmitted from the service processor to the chassis management module using an Intelligent Platform Management Interface (IPMI) protocol.

7. The method of claim 1, wherein the information is transmitted from the service processor to the chassis management module via a RS485 bus.

8. The method of claim 1, wherein the information is an Advance Configuration Power Interface (ACPI) sleep state.

9. A method for managing information from an operating system based environment, comprising:
   determining whether the information is to be communicated to a chassis management module; and
   transmitting the information to an Advance Configuration Power Interface (ACPI) based embedded controller on a service processor upon determining that the information is to be communicated with the chassis management module.

10. The method of claim 9, wherein transmitting the information to the service process comprises transmitting the information using a System Management Bus (SMBus) protocol.

11. The method of claim 9, wherein determining whether the information is to be communicated to the chassis management module comprises determining whether the information is a Advance Configuration Power Interface (ACPI) sleep state.

12. An article of manufacture comprising a machine accessible medium including sequences of instructions, the sequences of instructions including instructions which when executed causes the machine to perform:
   determining whether information is to be communicated to a chassis management module; and
   transmitting the information to an Advance Configuration Power Interface (ACPI) based embedded controller on the service processor upon determining that the information is to be communicated with the chassis management module.

13. The article of manufacture of claim 12, wherein transmitting the information to the service processor comprises transmitting the information using a System Management Bus (SMBus) protocol.

14. The article of manufacture of claim 12, wherein determining whether the information is to be communicated to the chassis management module comprises determining whether the information is an Advance Configuration Power Interface (ACPI) sleep state.

15. An Advanced Configuration Power Interface (ACPI) apparatus, comprising:
   an information identification unit to identify information originating from an operating system directed to a chassis management module; and
   an embedded controller interface to transmit the information to a service processor.

16. The apparatus of claim 15, wherein the information identification unit identifies Advanced Configuration and Power Interface (ACPI) sleep states.

17. The apparatus of claim 15, wherein the embedded controller interface transmits the information using the Smart Management Bus (SMBus) protocol.

18. The apparatus of claim 15, further comprising a system catalog unit to describe characteristics of a computer system to the operating system.

19. The apparatus of claim 15, wherein the service processor includes an Advance Configuration Power Interface (ACPI) based embedded controller to receive the information.

20. The method of claim 1, further comprising identifying the information, originating from an operating system, to be directed to the chassis management module.

21. The method of claim 9, further comprising identifying the information, originating from an operating system, to be directed to the chassis management module.

22. The article of manufacture of claim 12, further comprising instructions which when executed causes the machine to further perform identifying the information, originating from an operating system, to be directed to the chassis management module.

* * * * *